United States Patent [19]

Blood et al.

[11] Patent Number: 4,554,659
[45] Date of Patent: Nov. 19, 1985

[54] DATA COMMUNICATION NETWORK

[75] Inventors: Mark L. Blood, Columbus; Joseph W. Darnell, Gahanna; Allen D. Fergeson, Johnstown; David M. Rouse, Whitehall, all of Ohio

[73] Assignee: AT&T Bell Laboratories, Murray Hill, N.J.

[21] Appl. No.: 560,166

[22] Filed: Dec. 12, 1983

[51] Int. Cl.[4] .............................................. H04J 3/00
[52] U.S. Cl. ........................................ 370/88; 370/86
[58] Field of Search ...................... 370/86, 88, 85, 89; 340/825.05

[56] References Cited

U.S. PATENT DOCUMENTS

| | | | |
|---|---|---|---|
| 3,633,166 | 1/1972 | Picard | 370/86 |
| 3,781,815 | 12/1973 | Boudreau et al. | 370/86 |
| 3,786,418 | 1/1974 | Nick | 370/86 |
| 4,002,842 | 1/1977 | Meyr et al. | 370/86 |

Primary Examiner—Douglas W. Olms
Assistant Examiner—Wellington Chin
Attorney, Agent, or Firm—Dwight A. Marshall

[57] ABSTRACT

A data communication network comprising ring transmission paths (0,1) interconnecting ring interface nodes (2) arranged to propagate data along the ring transmission paths between data systems (6) coupled with the ring interface nodes. Each node has apparatus (210) coupled with ones of the ring transmission paths and data systems for receiving and temporarily storing bytes of data. Receiving structure (211) of the node enabled by predefined ones of data bytes appearing at an input of the receiving and temporarily storing apparatus derives information defining node dispose of the data and generates a disposition available signal. Transmitting structure (212) responsive to a first one of the predefined data bytes appearing at an output of the receiving and temporarily storing apparatus and enabled by the generated disposition available signal resets the disposition available signal generating structure and controls the ring interface node to receive the remaining bytes of data and disposition of the data in accordance with the derived disposition information at a transmitting rate independent of the rate of receiving incoming data.

24 Claims, 14 Drawing Figures

DATA MESSAGE

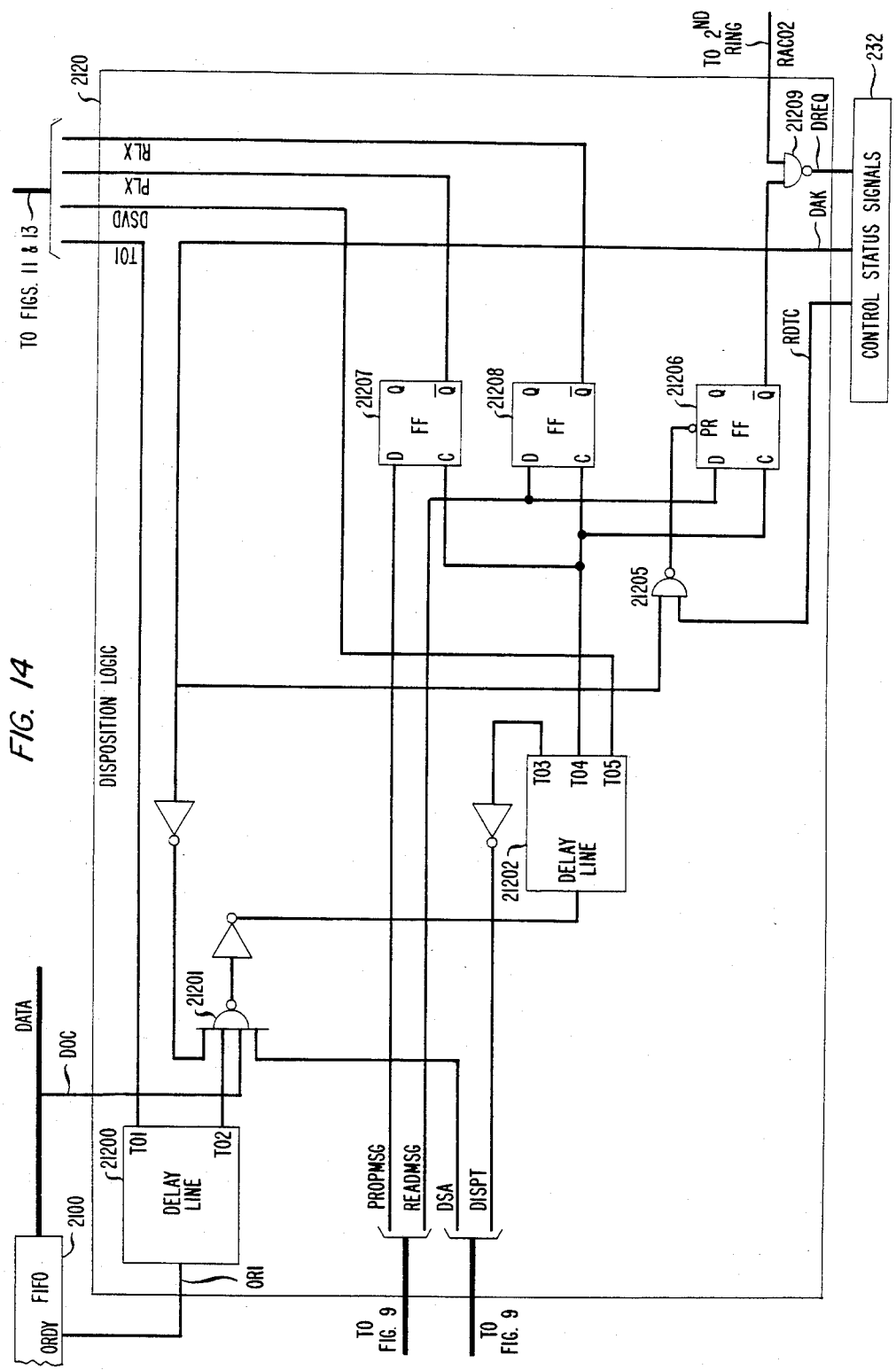

DATA COMMUNICATION NETWORK

FIELD OF THE INVENTION

This invention relates to a data communication network. In particular, it relates to a node arranged to couple data systems with ring transmission paths to form a network enabling communication between the data systems.

BACKGROUND OF THE INVENTION

Data communication networks are oftentimes used to interconnect data systems which use the networks to both send and receive data. Typically, such data communication networks may comprise ring transmission paths interconnecting ring interface nodes used to couple data systems with the ring transmission paths. In such a network data is usually transmitted from an originating data system to a ring interface node, oftentimes referred to simply as a node, and over a ring transmission path through intermediate nodes to a node coupled with a receiving data system.

Shift register type of data communication networks have been disclosed in the past where data is transmitted in a clockwise direction on one ring transmission path and in a counter clockwise direction on another ring transmission path. Such a system is analogous to an empty slot mechanism wherein individual frames of a fixed length keep circulating around a ring transmission path. In these types of networks a source node receiving data from an originating data system inserts the data into the circulating slots and a destination node removes the data from the circulating slot and transmits it to a receiving data system. Generally speaking these types of data communication networks require elaborate clocking schemes that shift the slots around the ring transmission path at a constant rate. Such networks may undesirably slow transmission of data when a large number of nodes are required to interconnect data systems.

Other types of data communication networks have nodes designed with register and by-pass circuitry wherein incoming data is both loaded into the register and by-passed around the node on the ring transmission path. The register and by-pass type of nodes oftentimes result in data that is addressed to a node and destined for a data system served by the addressed node to continue on the ring transmission path past the addressed or destination node. A problem arises with these types of data communication networks in that the flow of data past an addressed node unnecessarily increases the amount of data appearing on a ring transmission path and decreases the network data handling capabilities. In addition, these types of data communication networks require that the source node having originated the data, or a common node, be provided with ways to remove the bypassed data from the ring transmission path. Oftentimes this is accomplished by processor apparatus of the source node which must also perform the additional function of removing this data from a ring transmission path thereby resulting in a decrease in efficiency of the processor apparatus.

The foregoing and other problems are solved and a technical advance is achieved by a data communication network arranged to handle varying rates of data on ring transmission paths and by a node arranged to derive information defining the node disposition of incoming data and to dispose of the data in accordance with the derived disposition information without decreasing the data handling capabilities of the data communication network.

SUMMARY OF THE INVENTION

In the exemplary embodiment of the invention a node is arranged to couple a data bus with ring transmission paths to form a network enabling communication between data systems coupled with the data bus. The node comprises apparatus enabled by predefined data appearing on the data bus and incoming ones of the ring transmission paths for defining node disposition of the data and generating a disposition available signal. Apparatus coupled with the ring transmission paths and data bus receives and temporarily stores the data. Additional apparatus of the node responsive to a first one of the predefined data appearing at an output of the receiving and temporarily storing apparatus and enabled by the generated disposition available signal controls the node to propagate received data on the data bus and outgoing ones of the ring transmission paths in accordance with the defined node disposition.

In accordance with one feature of the invention a node is arranged for coupling a data bus with ring transmission paths to form a network enabling communication between data systems coupled with the data bus. The node comprises apparatus enabled by incoming data available leads associated with the data bus and incoming ring transmission paths for taking a byte of data appearing on the data bus and incoming ring transmission paths and loading the data taken byte in a receiving and temporarily storing buffer. Additional apparatus of the node enabled by predefined ones of the received data bytes derives information defining the node disposition of the incoming data and generates a disposition available signal to enable the node to propagate the received data on the data bus and outgoing ring transmission paths in accordance with the derived disposition information.

In accordance with another feature of the invention a node for coupling a data bus with ring transmission paths to form a network enabling communication between data systems coupled with the data bus comprises apparatus for receiving data bytes taken from the data bus and incoming ones of the ring transmission paths at one rate and temporarily storing said received data bytes for subsequent propagation on the data bus and outgoing ones of the ring transmission paths at a transmitting rate independent of the receiving rate.

In accordance with another feature of the invention a node for coupling a data bus with ring transmission paths to form a network enabling communication between data systems coupled with the data bus comprises apparatus for generating data available signals on outgoing data available leads associated with the data bus and outgoing ones of the ring transmission paths. Node apparatus responsive to a first one of predefined data bytes appearing at an output of a receiving and temporary buffer store and enabled by a generated disposition available signal selectively enables the data available generating apparatus to selectively apply data available signals to the outgoing data available leads in accordance with node disposition information derived from predefined bytes of incoming data.

In accordance with another feature of the invention, a node for coupling a data bus with ring transmission paths to form a network enabling communication between data systems coupled with the data bus comprises apparatus enabled by predefined broadcast data appearing on the data bus and incoming ones of the ring transmission paths for deriving information defining node disposition of the broadcast data and generating a disposition available signal. Node apparatus responsive to a first one of the broadcast data appearing at an output of a temporary storage buffer and enabled by the generated disposition available signal controls the node to receive the broadcast data and propagate the received broadcast data concurrently on the data bus and outgoing ones of the transmission paths in accordance with the node derived disposition information.

In further accordance with the invention a data communication network comprises a node interconnecting ring transmission paths to enable network communication with data systems coupled with ones of the transmission paths. Apparatus of the node is coupled with the transmission paths and is arranged to receive and temporarily store data. Receiving apparatus of the node is enabled by bytes of data appearing on incoming ones of the transmission paths and ones of the transmission paths coupled with data systems to load the data bytes at a receiving rate into the receiving and temporarily storing apparatus and to generate a disposition available signal after deriving information defining node disposition of the data from predefined ones of the data bytes. Transmitting apparatus responsive to a first one of the predefined data bytes appearing at an output of the receiving and temporarily storing apparatus and enabled by the generated disposition signal unloads the data bytes from the receiving and temporary storing apparatus and propagates the data bytes on ones of the transmission lines coupled with data system and outgoing ones of the transmission paths in accordance with the derived node disposition at a transmitting rate independent of the received data rate.

Also in accordance with the invention a method for enabling communication through a node coupling a data bus with ring transmission paths comprises the step of defining disposition of data incoming to the node from predefined data bytes appearing on the data bus and incoming ring transmission paths. The method further comprises the steps of receiving and temporarily storing incoming data bytes, generating a disposition available signal and controlling the node in response to a first stored predefined data byte and the generated disposition available signal to receive subsequent bytes of incoming data and propagate the incoming data on the data bus and outgoing ring transmission paths in accordance with the defined node data disposition.

DESCRIPTION OF THE DRAWING

The foregoing as well as other objects, features and advantages of the invention will be more apparent from a description of the drawing in which:

FIG. 14 shows logic circuitry of disposition logic for controlling the node to propagate received data on the data bus and outgoing ring transmission paths.

Figure 1:
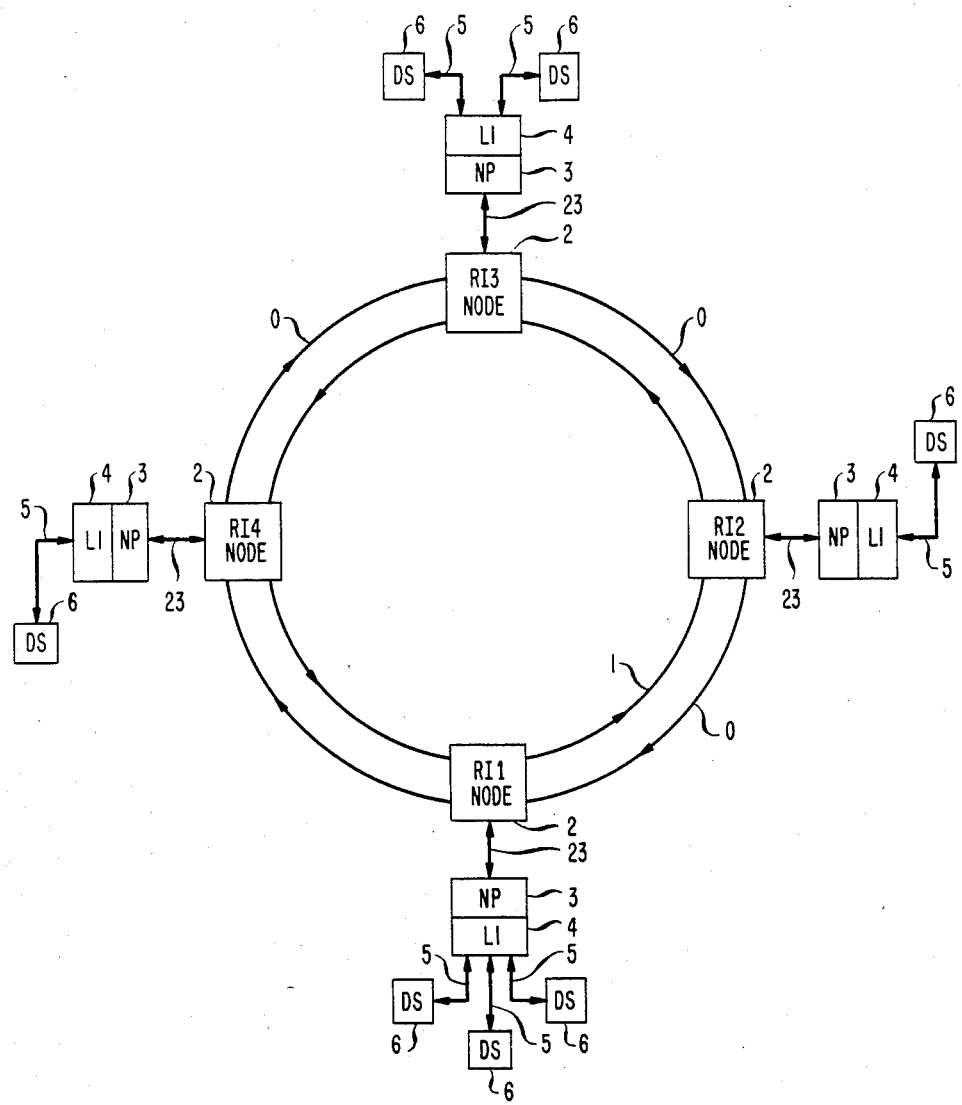
FIG. 1 is a block diagram of a data communication network utilizing nodes to couple data systems with ring transmission paths.

The detailed logic circuitry of the data communication network set forth in FIGS. 5 through 14 of the drawing, is performed by logic gates and registers, the operation of which are well-known in the art. Details of similar gates and registers are described by J. Millman and H. Taub in the text book *Pulse, Digital and Switching Waveforms*, 1965, McGraw-Hill, Inc., and in *The TTL Data Book for Design Engineers*, Second Edition, 1976, Texas Instruments Incorporated.

GENERAL DESCRIPTION

Referring to FIG. 1 of the drawing, the data communication network set forth therein comprises ring transmission paths 0,1 interconnecting a number of nodes R11, R12, R13, R14 each intended to couple data systems 6 with the data communication network. A node, hereinafter referred to as node 2, is connected by a data bus 23 with a node processor 3 and with a line interface unit 4 arranged to terminate data links 5 used to couple data systems 6 with the data communication network. Data system 6 may be another data communication network or any one of a number of well-known components such as computers and data terminals or the like and need not be described in detail.

In a normal mode of operation a data system 6 originates data and transmits the data over a data link 5 and through a line interface unit 4 to a node processor 3. Node processor 3 then signals the associated or source node 2 that there is data available. Node 2 responds to an indication of data available on data bus 23 or on ring transmission paths 0, 1, by deriving the node disposition of the data and generating a disposition available signal. Once the node disposition has been derived, node 2 propogates the data on ring transmission paths 0, 1, through intermediate nodes 2 to destination node 2 and over data bus 23 to node processor 3 through line interface unit 4 and data link 5 to a receiving data system 6.

Figure 4:
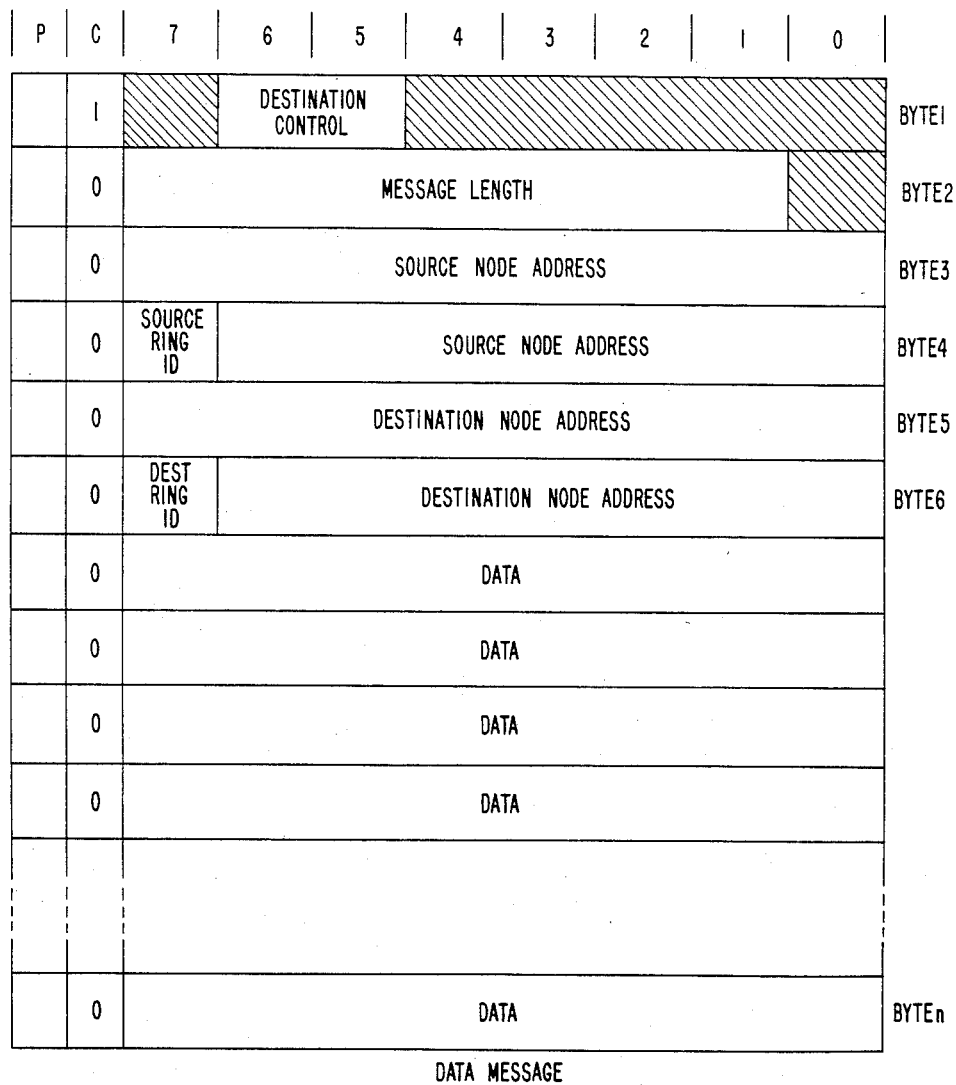
FIG. 4 is a functional diagram of the byte organization of the header portion of a network data message.

Referring to FIG. 4 of the drawing, data appearing on the data communication network comprises a number of multi-bit data bytes. In the exemplary embodiment of the invention it is assumed that each data byte comprises eight bits of data and has both a control bit "C" and a parity bit "P". The first six bytes form a header for the data and identify both the source and destination nodes. More specifically, a logical 1 appearing in the "C" bit position of the first data byte identifies the start of a data message. Bits 5 and 6 of the first data byte, hereinafter referred to as byte 1, defines the destination control of the data. For example, the code 00 can be used to indicate general broadcast data that is to be received by all nodes 2 and code 10 to indicate that the data is intended for the next node 2 directly following the propagating node 2. Code 01 may indicate selective broadcast data sent to specific nodes 2 and code 11 may be used to identify data that is being sent to a specific ring destination node 2. Data byte 2 may be used to specify the total number of bytes comprising the data and bytes 3 and 4 contain the address of a node 2 that is the source of the data. The address of the node 2 for which the data is destined is identified in data bytes 5 and 6. An 0 or 1 recorded in bit 7 of data bytes 4 and 6 identifies the ring transmission paths 0,1 on which the data is propagated from source node 2 and is to be received by destination node 2.

Figure 2:
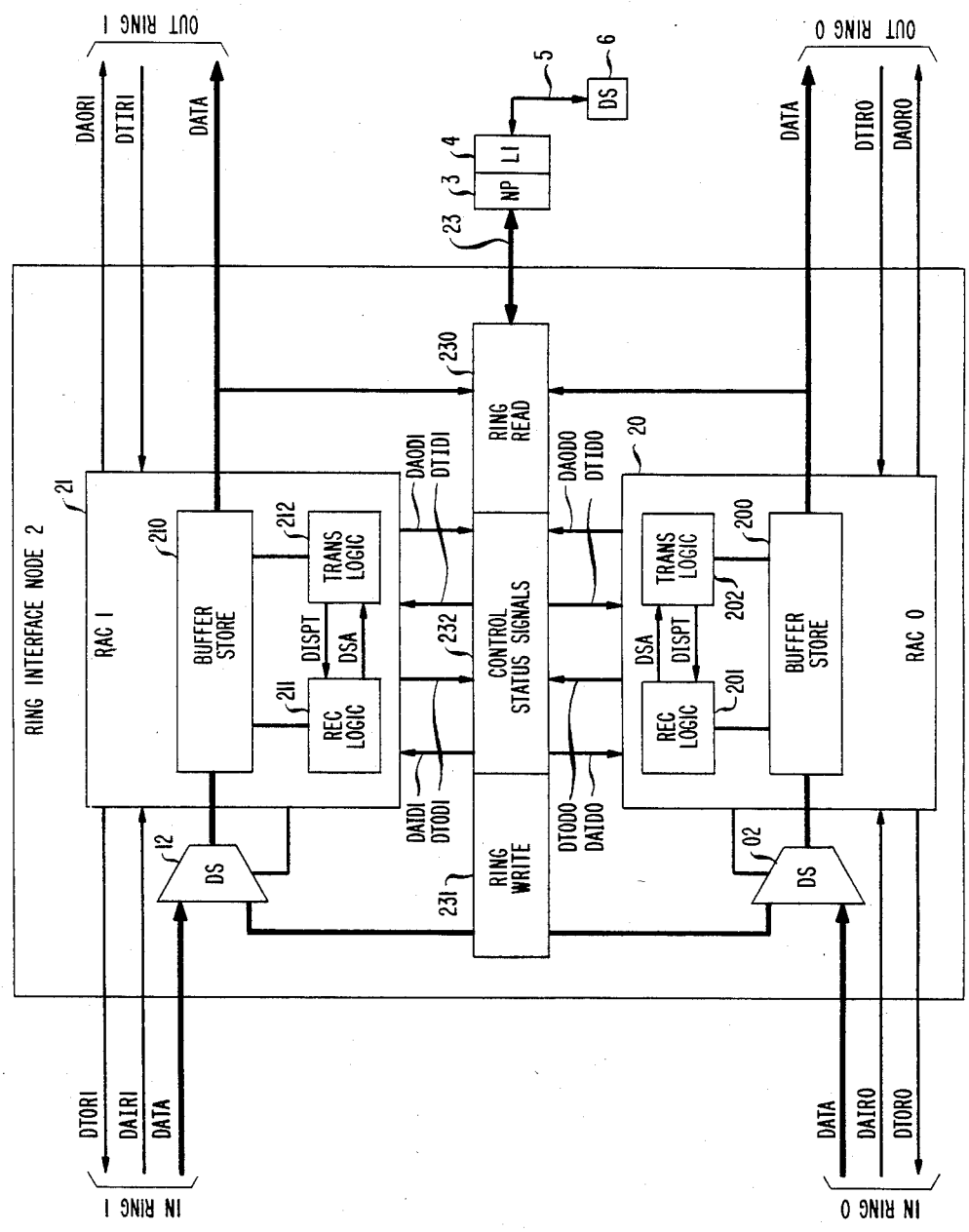
FIG. 2 is a block diagram of a node embodying the principles of the instant invention.

A preceding node 2 initiates propagation of data, FIG. 2, by enabling a data available incoming lead DAIR0, DAIR1 associated with a ring transmission path 0,1. Similarly, node processor 3 having received data from a data system 6 coupled with line interface unit 4 signals the associated node 2 control status signals apparatus 232 over data bus 23 to enable the appropriate data available incoming lead DAID0, DAID1. Each node 2 has ring access control apparatus 20, 21 associated with each ring transmission path 0,1 and with data bus 23 coupled with node processor 3. For the present embodiment of the invention it will be assumed that each ring access control apparatus 20, 21 is identical to the other and performs the same functions for the associated ring transmission path 0,1. Accordingly, the operation of one ring access control apparatus 21 will be described in detail with respect to ring transmission path 1 and data bus 23 with the understanding that ring access control apparatus 20 will perform in the same manner with ring transmission path 0 and data bus 23.

Assuming that a data available signal has appeared on either data available incoming lead DAIR1 or DAID1, receive logic 211 of ring access control apparatus 21 responds by loading data byte 1 appearing at the output of a preceding node 2 or node processor ring write apparatus 231 into buffer store 210. Buffer store 210 is coupled by data selector 12 with ring transmission path 1 connected to the output of a preceding node 2 and with data bus 23 connected via node processor 3 and line interface unit 4 with data system 6.

Once data byte 1 has been accepted for loading onto buffer store 210, receive logic 211 enables the appropriate data taken out lead DTOR1 or DTOD1 to signal the preceding node 2 or ring write apparatus 231 that data byte 1 has been taken by receiving node 2. Upon receipt of a data taken signal the preceding node 2, or control status signals apparatus 232 coupled with node processor 3, again enables data available input leads DAIR1 and DAID1, respectively, to indicate that data byte 2 is ready to be sent to receiving node 2.

The data available and data taken sequence is continued to load data bytes of the header portion of the data into buffer store 210. Bytes 1 through 6 of the header data appearing at the input of buffer store 210 enables receive logic 211 to derive information that defines the operation of receiving node 2 required for disposition of the data. For example, receive logic 211 may indicate that the received data is to be propagated over a ring transmission path to the following node 2 or read through the ring read apparatus 230 over data bus 23 to node processor 3 and data system 6. In addition to defining the node disposition of the receive data, receive logic 211 generates a disposition available signal for use by transmitting logic 212 indicating that the disposition information has been derived and is available for use.

Buffer store 210 is of a size sufficient to receive and temporarily store a number of data bytes greater than the number of data bytes in the header but considerably less than the number of data bytes usually included in a data message. Transmitting logic 212 enabled by the generated disposition available signal and responsive to data byte 1 appearing at the output of buffer store 210 controls node 2 to receive the remainder of the data and dispose of it in accordance with the information derived by receive logic 211. In accordance with the derived information transmitting logic 212 enables the appropriate data available out leads DAOR1 and DAOD1 to indicate that data byte 1 of the data is available to be propagated on ring transmission path 1 to the following node 2 or read through the ring read apparatus 230 over data bus 23 to node processor 3. After data byte 1 has been taken from the output of buffer store 210 a signal returned on the data taken incoming leads DTIR1 and DTID1 enables transmitting logic 212 to place a data available signal on the appropriate lead DAOR1 and DAOD1 to indicate that data byte 2 is now available at the output of buffer store 210. Transmitting logic 212 continues the propagation of data from node 2 under control of the data available and data taken leads coupled therewith at a rate independent of the rate at which incoming data is received under control of receive logic 211.

DETAILED DESCRIPTION

Incoming Data

Figure 3:
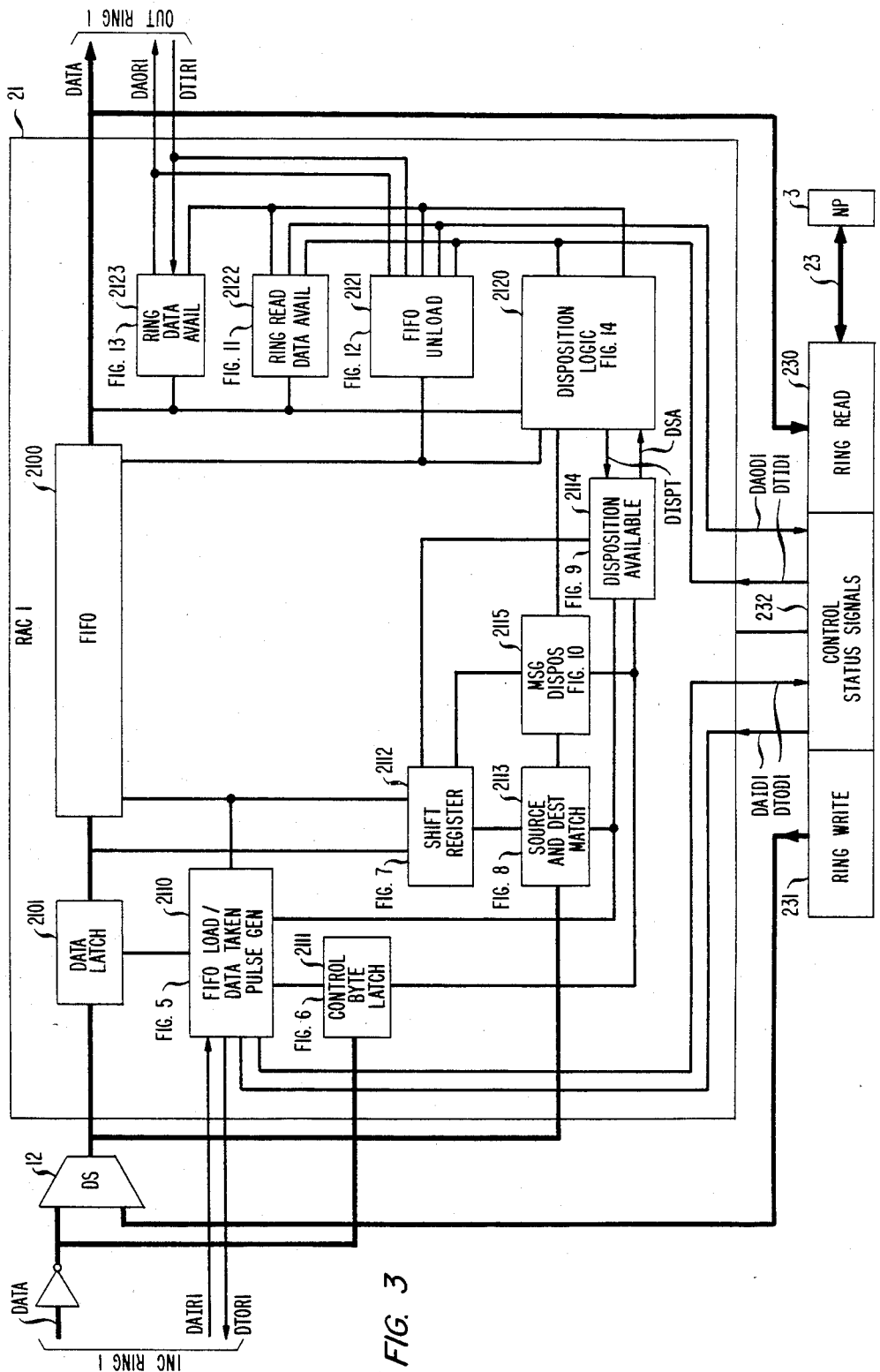
FIG. 3 is a block diagram of a node ring access control arranged to couple a data bus with an incoming and outgoing ring transmission path.

Referring now to FIG. 3 of the drawing, incoming and outgoing ring transmission paths 1 are each assumed to have ten parallel leads interconnecting node 2 with a preceding and following node 2. Leads numbered 0 through 7 are used to receive and transmit eight bit bytes of data and leads 8 and 9 are used to carry the control bit "C" and parity bit "P" respectively. In addition, the data available incoming lead DAIR1 and data taken out lead DTOR1 couple node 2 with the preceding node 2. The data available out lead DAOR1 along with data taken incoming lead DTIR1 couple node 2 with the following node 2.

Node processor 3 may be coupled by a bidirectional transmission path or data bus 23 and control leads to ring write 231, control status signals 232, and ring read 230 apparatus of node 2. Data may be read off of incoming ring transmission path 1 through ring read apparatus 230 onto data bus 23 and written onto outgoing ring transmission path 1 from data bus 23 through ring write apparatus 231. Data available outgoing lead DAOD1 and data taken incoming lead DTID1 are associated with ring read apparatus 230 and are used by control status signals apparatus 232 to control the reading of data onto data bus 23. Similarly, data available incoming lead DAID1 and data taken outgoing lead DTOD1 enable control status signals apparatus 232 to control the writing of data from data bus 23 onto outgoing ring transmission path 1.

A preceding node 2 desiring to propagate data on incoming ring transmission path 1 to node 2 applies an enabling signal on data available incoming lead DAIR1. The enabling signal appearing at the input of FIFO load and data taken pulse generator apparatus 2110 of ring access control 21, FIG. 5, resets logic circuit 21101 to place a high signal on an input of NAND gate 21102. Since all of the other inputs to NAND gate 21102 are high at this time the output of this gate responds to apply a low signal to an input of NAND gate 21104. With a low signal appearing on data available incoming lead DAID1 and on the control status signals request to write lead DREQWR, the high signal appearing at the output of NAND gate 21103 in combination with the low output of NAND gate 21102 results in a high signal appearing at the output of NAND gate 21104.

Figure 5:
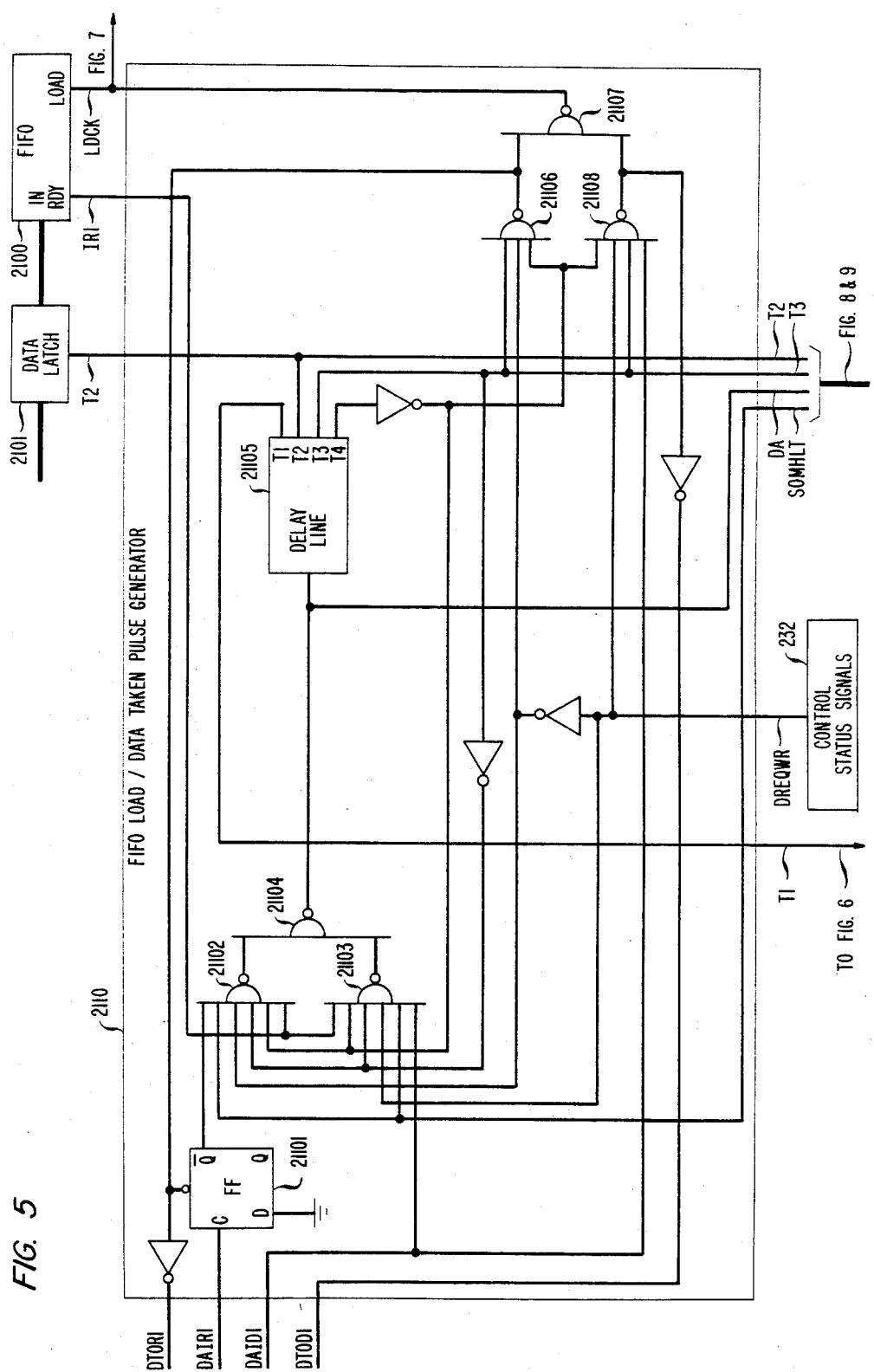
FIG. 5 sets forth the logic circuitry of FIFO load and data taken pulse generator apparatus for taking and loading data in a buffer store.
Figure 8:
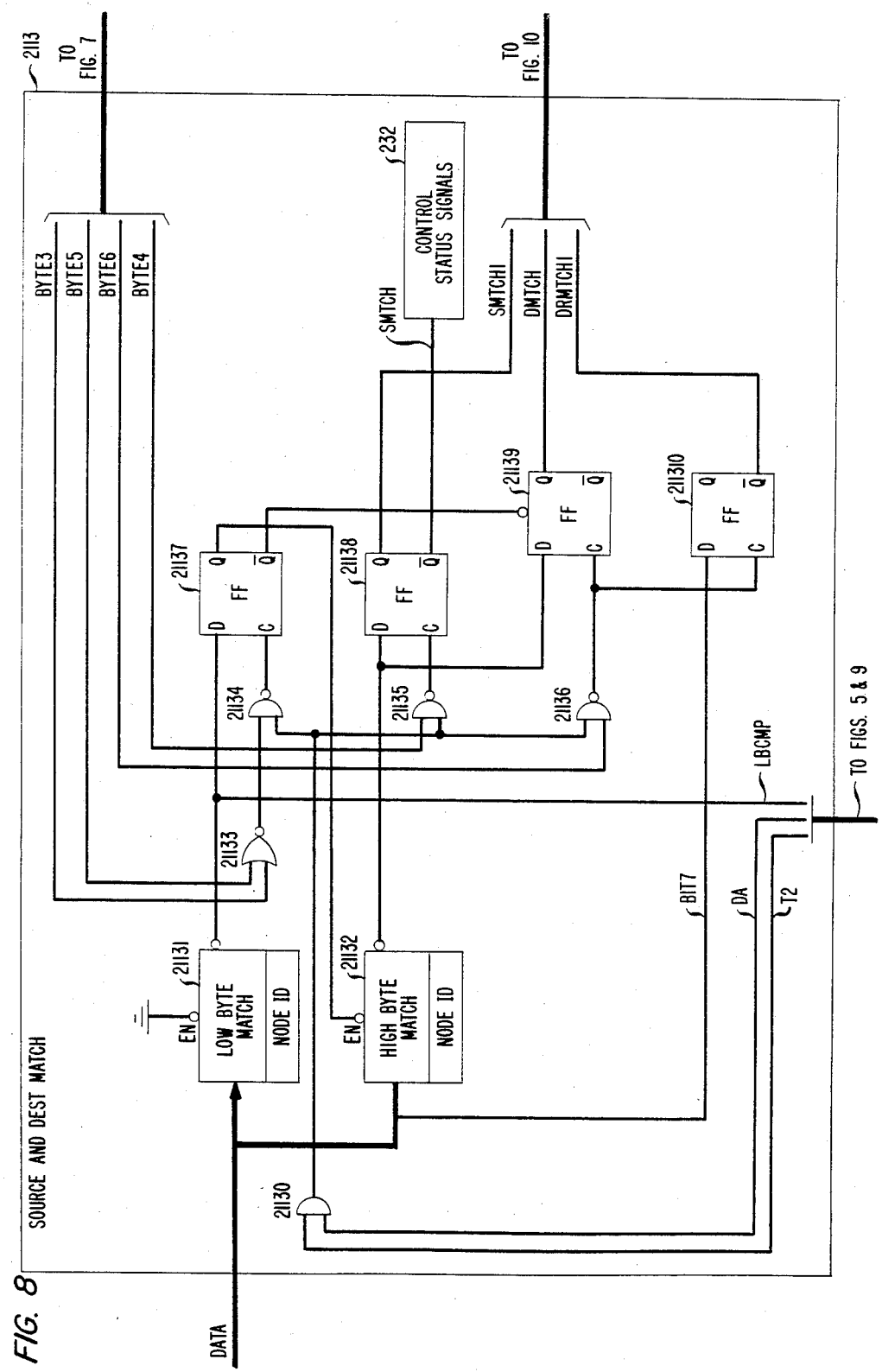
FIG. 8 shows logic circuitry of source and destination match apparatus for matching bytes of message header data with a node identification address.

The high signal output of NAND gate 21104 appears on lead DA to partially enable AND gate 21130, FIG. 8, of source and destination match apparatus 2113 and at the input, FIG. 5, of delay line 21105. A high signal is propagated through delay line 21105 and first appears as a delayed high signal at time T1 on strobe lead T1 which is coupled to an input of AND gate 21111, FIG. 6, of control byte latch apparatus 2111.

Figure 6:
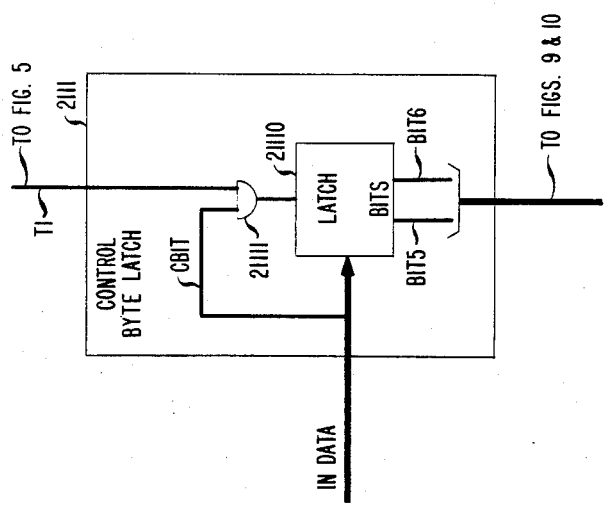
FIG. 6 shows logic circuitry of control bit latch apparatus for registering predefined bits of a first data byte.

As set forth in FIG. 3 of the drawing each byte of data appearing on incoming ring transmission path 1 also appears at the input of control byte latch 2111. The control bit C, FIG. 6, of data header byte 1 in combination with the high signal appearing on strobe lead T1 enables AND gate 21111 of control byte latch apparatus 2111 to register bits 5 and 6 defining the destination control information of the incoming data. Initially, it will be assumed that the destination control information contained in header byte 1, FIG. 4, indicates that the data is intended for a specific node 2 identified by the node destination address set forth in header bytes 5 and 6. Furthermore, it is assumed at this time that the data is destined for a following node 2 located at a different position on ring transmission path 1. Accordingly, bits 5 and 6 now registered in control byte latch 2111, FIG. 6, are each assigned a logical value of one thereby resulting in a high signal appearing on leads BIT5 and BIT6.

Delay line 21105, FIG. 5, next enables strobe lead T2 at time interval T2. The resulting high signal applied to strobe lead T2 enables data latch 2101 to register header byte 1 of the incoming data appearing on the leads of incoming ring transmission path 1. In addition, the delayed high signal appearing on strobe lead T2 in combination with the high signal on lead DA enable AND gate 21130 of the source and destination match apparatus 2113, FIG. 8, to apply a high signal at one input of NAND gates 21134, 21135, and 21136. Since the other inputs of these gates are low at this time the states of logic circuits 21137, 21138, 21139, and 211310 remain unchanged.

At time T3, delay line 21105, FIG. 5, applies a delayed high signal to strobe lead T3 connected to an input of NAND gate 21106. With the other inputs high the output of NAND gate 21106 goes low to preset logic circuit 21101 and thereby place a low signal on an input of NAND gate 21102. In addition, the low signal output of NAND gate 21106 is inverted and returned as a high signal on data taken output lead DTOR1 to inform the preceding, or sending, node 2 that byte 1 of the data header has been taken by receiving node 2. The delayed high signal on strobe lead T3 clocks logic circuit 21144 of disposition available apparatus 2114, FIG. 9, thereby maintaining a low signal on lead DSA and a high signal on lead DISPAV.

NAND gate 21107, FIG. 5, responds to the low signal output of NAND gate 21106 by placing a high signal on lead LDCK to load byte 1 previously registered in data latch 2101 into FIFO store 2100. The high signal on lead LDCK is also coupled to shift register apparatus 2112 set forth in FIG. 7 of the drawing. Header byte counter 21120 in the manner hereinafter described in detail, was originally initialized by a low signal appearing on lead DISPAV. The logical 1 appearing in the C bit position of data header byte 1 is shifted within header byte counter 21120 by the high signal appearing on lead LDCK to appear as a high signal on lead BYTE2 as an indication that node 2 is ready to receive and store byte 2 of the incoming data header.

Figure 9:
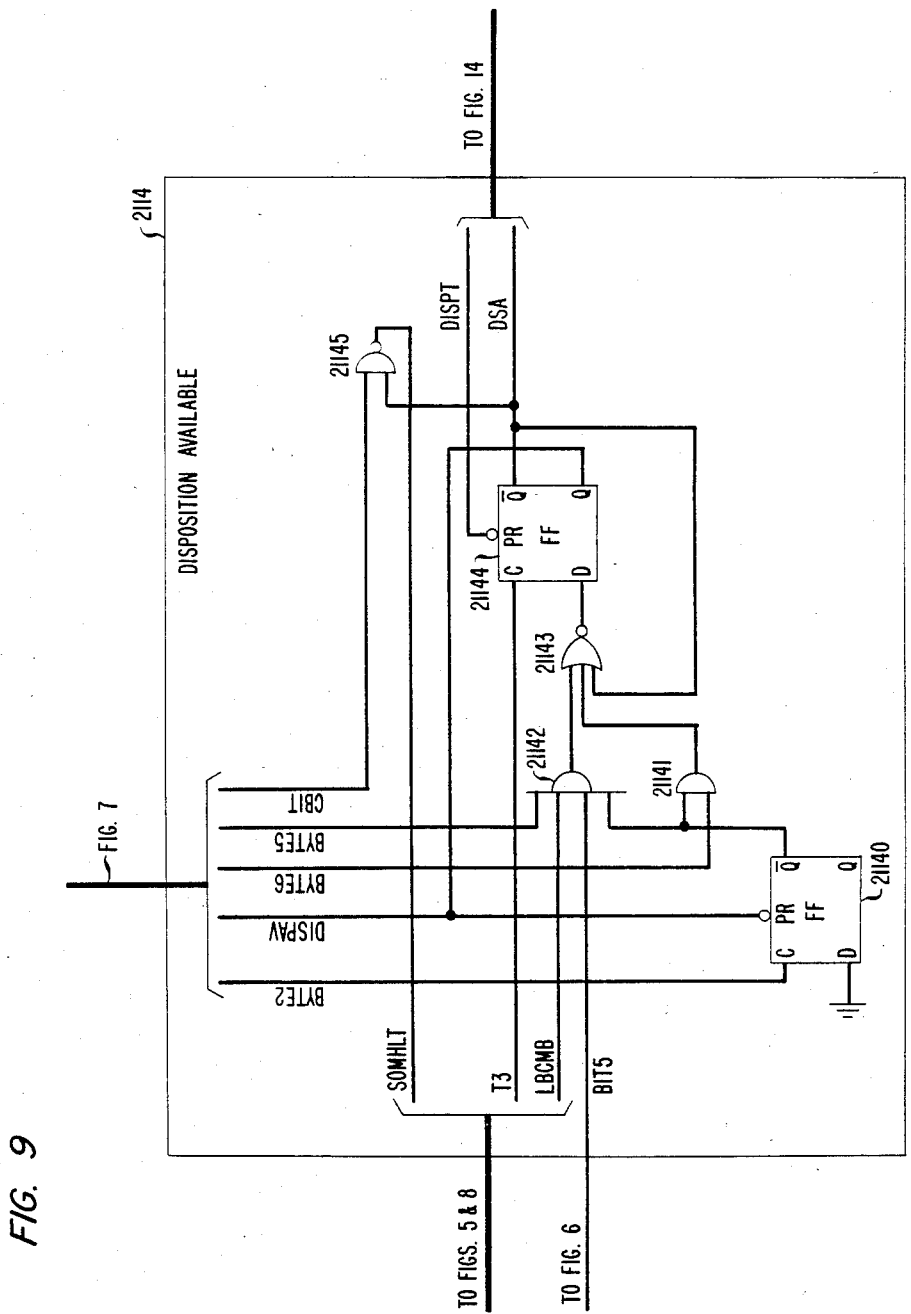
FIG. 9 shows logic circuitry of node disposition available apparatus.

The high signal appearing on lead BYTE2, FIG. 9, clocks logic circuit 21140 of disposition available apparatus 2114 to partially enable an input of AND gates 21141 and 21142. Lead BYTE2 also extends to message disposition apparatus 2115, FIG. 10, so that the high signal appearing thereon clocks logic circuit 21151 to apply a high signal to one input of AND gate 21152.

At time T4, FIG. 5, delay line 21105 applies a delayed high signal to output T4. This high signal is inverted and appears as a low signal at the inputs of NAND gates 21102, 21103, 21106 and 21108. The output of NAND gate 21106 goes high in response to a low signal input and is inverted into a low signal applied to data taken output lead DTOR1. The high signal appearing on leads DTOR1 and LDCK for the time interval T3 to T4 notifies the preceding or sending node 2 that data byte 1 has been taken and received by node 2 and stored in FIFO store 2100.

Following the propagation of the high signal through delay line 21105, outputs T1, T2, T3, and T4 sequentially return to a low signal state. The inverted low output T4 is inverted into a high signal to partially enable NAND gates 21102 and 21103. When FIFO store 2100 is ready to receive another data byte, a high signal is placed on lead IR1 to enable an input of NAND gates 21102 and 21103.

The preceding or sending node 2 indicates that byte 2 of the data header is available by enabling data available incoming lead DAIR1 to clock logic circuit 21101 to place a high signal on an input of NAND gate 21102. In the aforementioned manner the resulting high signal output of NAND gate 21104 is propagated through delay line 21105 to sequentially appear as high signals on strobe leads T1, T2, T3, T4.

The delayed high signal appearing on strobe lead T1 partially enables AND gate 21111, FIG. 6, of control byte latch apparatus 21111. However the control bit C of data byte 2 is a logical 0 thereby inhibiting AND gate 21111 from entering data byte 2 into latch 21110. Since bits 5 and 6 of data byte 1 are still registered therein leads BIT5 and BIT6 remain high until another byte 1 appears on incoming ring transmission path 1. At time T2, data byte 2, FIG. 5, is taken from the preceding or sending node 2 and loaded into data latch 2101.

As earlier described delay line 21105 enables strobe lead T3 which is inverted into a low signal that is applied to inputs of NAND gates 21102 and 21103. NAND gate 21102 responds by applying a high signal to an input of NAND gate 21104 to remove the high signal from lead DA and the input of delay line 21105. In addition, the delayed high signal on strobe lead T3 enables NAND gate 21106 to preset logic circuit 21101 and to apply a high signal on data taken output lead DTOR1. NAND gate 21106 enables NAND gate 21107 to apply a high signal to lead LDCK to load data byte 2 into FIFO store 2100 and to clock header byte counter 21120, FIG. 7, of shift register apparatus 2112 to shift the high signal from lead BYTE2 to lead BYTE3. The high signal appearing on lead BYTE3, FIG. 8, enables OR gate 21133 of source and destination match apparatus 2113 to partially enable an input of NAND gate 21134.

Strobe lead T4, as earlier set forth, inhibits NAND gate 21106 at time T4, FIG. 5, to remove the high signal from data taken out lead DTOR1 and to enable NAND gate 21107 to return lead LDCK to the low signal state. When FIFO store 2100 returns a high signal on lead IR1 and delay line 21105 returns strobe leads T3 and T4 to the low signal state, NAND gate 21102 is again ready to respond to a data available indication from logic circuit 21101.

The preceding or sending node 2 indicates that byte 3 of the data header is available by placing a high signal on data available incoming lead DAIR1. In the aforementioned manner, logic circuit 21101, NAND gates 21102, 21104 respond thereto and enable delay line 21105 to successively apply delayed high signals to strobe leads T1, T2, T3 and T4. In addition to receiving and registering data byte 3 in data latch 2101, the delayed high signal appearing on strobe lead T2 in combination with the high signal appearing on lead DA enable AND gate 21130, FIG. 8, of source and destination match apparatus 2113.

Each byte of data appearing at the input of data latch 2101 also appears at the input of low and high byte match circuits 21131 and 21132. The incoming data bytes are compared with the unique address of node 2 and upon a match therewith, low and high byte match circuits 21131 and 21132 place a low signal on output leads connected to inputs of logic circuits 21137, 21138 and 21139. It will be assumed at this time that the incoming data was originated by another node 2 and that the address information contained in data byte 3 does not match the unique node identity address recorded in low byte match circuit 21131. Accordingly, a high signal appears at the input of logic circuit 21137. Since NAND gate 21134 is partially enabled by lead BYTE3 and OR gate 21133, NAND gate 21134 is thereby enabled at time T2 to apply a clock signal to logic circuit 21137. Since the input to logic circuit 21137 is high at this time the outputs thereof maintain a high signal on the EN input of high byte match circuit 21132 and a low signal on the preset input of logic circuit 21139.

Figure 7:
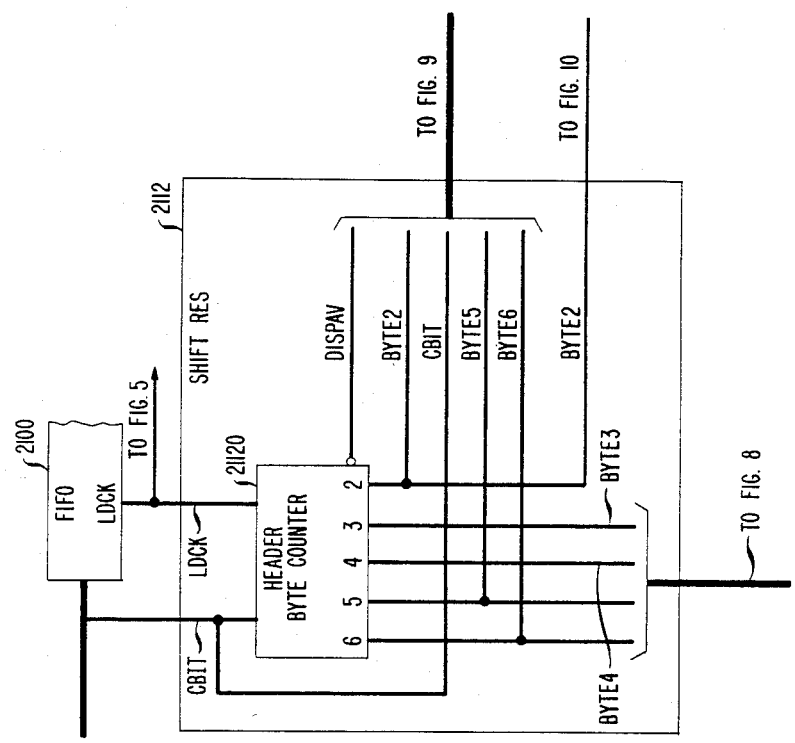
FIG. 7 shows logic circuitry of shift register apparatus for counting bytes of message header data.

At time T3, the operation of NAND gates 21106 and 21107, FIG. 5, return a data taken signal via lead DTOR1 to the preceding or sending node 2, loads data byte 3, via lead LDCK, into FIFO store 2100, and clocks header byte counter 21120, FIG. 7, to shift the high signal output from lead BYTE3 to lead BYTE4. A high signal appearing on lead BYTE4, FIG. 8, is applied to an input of NAND gate 21135 of source and destination match apparatus 2113. Subsequent enablement of strobe lead T4, FIG. 5, removes the data taken signal from lead DTOR1 and in combination with an input ready signal on lead IR1 from FIFO store 2100 prepares FIFO load and data taken pulse generator apparatus 2110 for receipt of data byte 4.

When data byte 4 is available at the preceding or sending node 2 the data available signal appearing on lead DAIR1 enables delay line 22105 at time T2 to register data byte 4 in data latch 2101. The delayed high signal appearing on strobe lead T2 in combination with the high signal on lead DA, FIG. 8, enables AND gate 21130 to clock logic circuit 21138 via NAND gate 21135. Since high byte match circuit 21132 is inhibited by the high signal appearing on the Q output of logic circuit 21137, the state of logic circuit 21138 maintains a high signal on lead SMTCH1.

In the aforementioned manner, delay line 21105, FIG. 5, returns a data taken signal at time T3, loads data byte 4 into FIFO store 2100 and clocks header byte counter 21120, FIG. 7, to shift the high signal output from lead BYTE4 to BYTE5. A high signal appearing on lead BYTE5, FIG. 8, partially enables NAND gate 21136 of source and destination match apparatus 2113 and is applied to an input of AND gate 21142, FIG. 9, of disposition available apparatus 2114. Logic circuit 21140, previously clocked by lead BYTE2, and lead BIT5 both apply high signals to inputs of NAND gate 21142. Since incoming data byte 4 identifying a node 2 that was the source of the incoming data did not match the node identify recorded in low byte match circuit 21131 of source and destination match apparatus 2114, a high signal appears on lead LBCMB coupled to an input of AND gate 21142. The high signal now appearing on lead BYTE5 thereby enables AND gate 21142 to apply a high signal to NOR gate 21143 which in turn places a low signal on the input of logic circuit 21144. Due to the delay incurred by NAND gates 21106, 21107; shift register apparatus 2112; AND gate 21142 and NOR gate 21143; the low signal output of NOR gate 21143 is applied to the input of logic circuit 21144 at a time after logic circuit 21144 has been clocked by strobe lead T3. Thus, the output state of logic circuit 21144 remains unchanged at this time.

Delay line 21105, FIG. 5, returns lead DTOR1 to normal at time T4 and in combination with lead IR1 prepares FIFO load and data taken pulse generator apparatus 2110 for receipt of the next data available signal on lead DAIR1.

The availability of data byte 5, as evidenced by the data available signal on lead DAIR1 enables operation of delay line 21105 to load data byte 5 into data latch 2101 at time T2. Since it is assumed that the incoming data is destined for another node 2 both low and high byte match circuits 21131 and 21132, FIG. 8, remain inhibited thereby maintaining a high signal on lead LBCMP and inputs of logic circuits 21137, 21138 and 21139. Lead T2 operation of AND gate 21130 strobes NAND gate 21134 to clock logic circuit 21137 which remains unchanged.

The delayed high signal appearing at time T3 on strobe lead T3, FIG. 9, clocks logic circuit 21144. Since the output of NOR gate 21143 is low at this time logic circuit 21144 changes state in response to the strobe signal T3 by placing a low signal on lead DISPAV and a high signal on disposition available lead DSA.

It was previously determined that incoming data bytes 3 and 4 did not match the node identify of node 2 thereby indicating that the incoming data did not originate at the present node 2. Thus, the failure of incoming data byte 5 to match the node identify registered in low byte match circuit 21131 of source and destination match apparatus 2113 indicates that the incoming data is to be propagated out of node 2 on a ring transmission path.

At this time there are high signals appearing at the output of the source and destination match apparatus logic circuits 21138 and 21139 on leads SMTCH1 and DMTCH respectively. Decoder 21150, FIG. 10, basically comprises a dual 4 line to 1 line data selector of the type set forth at page 7-165 of the aforementioned TTL Data Book. Thus, high signals appearing on leads SMTCH1 and DMTCH in combination with the high signals appearing on leads BIT5,6 which are inverted and applied to decoder 21150, enable decoder 21150 to apply a high signal to the input of NOR gate 21154. NOR gate 21154 is thereby enabled to apply a low signal to lead PROPMSG as an indication that the incoming data is to be propagated on a ring transmission path to the following node. At this time, FIG. 3, message disposition apparatus 2115 has derived information specifying that the incoming data is to be propagated on a ring transmission path and disposition available apparatus 2114 has generated a disposition available signal on lead DSA. The high signal appearing on lead DSA, FIG. 9, in combination with the high signal on lead CBIT enable NAND gate 21145 to place a low signal on lead SOMHLT. A low signal appearing on lead SOMHLT signifies the start of message halt and is applied, FIG. 5, to inputs of NAND gates 21102 and 21103 to prevent FIFO load and data taken pulse generator apparatus 2110 from receiving data of another data message from ring transmission path 1 or node processor 3.

FIFO store 2100 is an asynchronous first in, first out memory similar to the type set forth at page 5-54 of the aforementioned TTL Data Book. When byte 1 of the incoming data is stored in FIFO store 2100, byte 1 propagates through FIFO store 2100 from the input thereof to the output at a rate independent of the data received at the input. A data byte appearing at the output of FIFO store 2110, FIG. 14, results in a high signal being applied over output ready lead OR1 to an input of delay line 21200 of disposition logic 2120. At time T01 a delayed high signal is applied to lead T01 to partially enable NAND gate 21224, FIG. 11, of ring read data available apparatus 2122 and NAND gate 21230, FIG. 13, of ring data available apparatus 2123, FIG. 13.

Referring to FIG. 14 of the drawing, delay line 21200 applies a high signal at time T02 to an input of NAND gate 21201. Since data byte 1 has appeared at the output of FIFO store 2100, the logical one of the C bit results in a high signal appearing on lead DOC to enable another input of NAND gate 21201. Lead DAK used by node processor 3 to acknowledge a read request by node 2 is low at this time and is inverted and applied as a high signal to an input of NAND gate 21201. With all inputs high the resulting low signal output of NAND gate 21201 is inverted and applied as a high signal to delay line 21202. At time T03 a delayed high signal appearing at the T03 output of delay line 21202 is inverted and applied to lead DISPT to indicate that the derived disposition has been accepted.

A low signal appearing on disposition taken lead DISPT, FIG. 9, resets disposition available apparatus 2114 by presetting lpgic circuit 21144. The resulting low signal appearing on disposition available lead DSA appears on inputs of NOR gate 21143 and NAND gate 21145. NAND gate 21145 responds thereto by placing a high signal on lead SOMHLT to partially enable NAND gates 21102 and 21103 of FIFO load and data taken pulse generator apparatus 2110, FIG. 5. The return of start of message halt lead SOMHLT to the high signal or normal state denotes that the halt in receiving new incoming data messages is over and that node 2 may receive either the remainder of the incoming data or a new data message. Thus, the high signal on lead SOMHLT enables an input of NAND gates 21102 and 21103 so that the NAND gates can respond to all data available signals on lead DAIR1. Preset logic circuit 21144, FIG. 9, also returns a high signal to logic circuit 21140 to enable logic circuit 21140 to respond to lead BYTE2 set by the next incoming data message.

At time T04, FIG. 14, the high signal applied to the input of delay line 21202 appears at output T04 to clock logic circuits 21207 and 21208. Since a high signal appears on lead READMSG at this time the state of logic circuit 21208 maintains a low signal on lead RLX. With a low signal appearing on propagate message lead PROPMSG logic circuit 21207 is clocked at time T04 to place a high or enable signal on lead PLX. Subsequently, the high signal applied to the input of delay line 21202 appears at output T05 and is applied via lead DSVD to ring data available apparatus 2123, FIG. 13. With high signals appearing on leads DSVD, DOC and PLX, NAND gate 21231 enables NAND gate 21232 to reset logic circuit 21233 to apply a high signal to data available outgoing lead DAOR1.

The high signal appearing on data available outgoing lead DAOR1, FIG. 3, notifies the following node 2 coupled to outgoing ring transmission path 1 that header byte 1 of the data is available to be taken. A data taken signal appearing as a high signal on lead DTIR1 sets logic circuit 21233, FIG. 13, to remove the data available signal from lead DAOR1 and is applied as an inverted signal to an input of AND gate 21211 of FIFO unload apparatus 2121, FIG. 12. With low signals appearing on inputs AND gate 21211 is inhibited to cause NAND gate 21213 to apply a high signal to lead UNCK to unload FIFO store 2100.

The appearance of header byte 2 at the output of FIFO store 2100 enables delay line 21200, FIG. 14, to apply a delayed high signal to lead T01. This high signal in combination with the high signal on propagate lead PLX, FIG. 13, and the inverted low signal now appearing on lead DOC enables NAND gate 21230 to apply a low signal to an input of NAND gate 21232. NAND gate 21232 responds by resetting logic circuit 21233 to enable data available out lead DAOR1. Lead DAOR1 notifies the following node 2 on ring transmission path 1 that data byte 2 is available and partially enables AND gate 21211, FIG. 12, to await the return of a data taken signal on data taken in lead DT1R1. When the data taken in signal appears on lead DTIR1, AND gate 21211 responds by enabling NOR gate 21213 to place a high signal on lead UNCK to unload data byte 2 from FIFO store 2100.

Receive logic 211, FIG. 2, of node 2 continues, in the aforementioned manner, to receive remaining bytes of the incoming data on incoming ring transmission path 1 and temporarily store them in buffer store apparatus 210.

The rate of propagating data on incoming ring transmission path 1 into node 2 depends upon the data available and taken signals appearing on leads DAIR1 and DTOR1 that enable FIFO load and data taken pulse generator apparatus 2110 to receive and temporarily store the incoming data in buffer apparatus store 210. Independently of the propagation rate of the incoming data, transmission logic 212 continues to propagate the data bytes appearing at the output of buffer store apparatus 210 on outgoing ring transmission path 1. The rate of propagating data to the following node 2 on outgoing ring transmission path 1 depends upon the data available and data taken signals appearing on leads DAOR1 and DTIR1 that enable ring data available apparatus 2122, FIG. 3, and FIFO unload apparatus 2121 to unload each byte of data from FIFO store 2100 onto outgoing ring transmission path 1.

Data Read

A data message that is intended for a specific or destination node 2, FIG. 4, will have the destination node address recorded in bytes 5 and 6 of the incoming data. When the node address recorded in bytes 5 and 6 of the header of the incoming data match the address of the receiving node 2 the data is read off incoming ring transmission path 1, FIG. 3, onto data bus 23 through ring read apparatus 230.

When byte 5 of the data header is available at the preceding node 2 the data available signal appearing on lead DAIR1, FIG. 5, causes delay line 21105, via logic circuit 21101 and NAND gates 21102 and 21104 to enable strobe lead T2. Since the node address recorded in header byte 5 now appearing on incoming ring transmission path 1, FIG. 8, matches the node identification information registered in low byte match circuit 21131, a low signal is applied to lead LBCMP. The low signal on lead LBCMP is applied to an input of logic circuit 21137 and to AND 21142, FIG. 9, of disposition available apparatus 2114. AND gate 21142 is inhibited to apply a low signal to NOR gate 21143 which having all inputs low at this time maintains a high signal on the input of logic circuit 21144.

The enabling of strobe lead T2, FIG. 8, in combination with the high signal appearing on lead DA causes AND gate 21130 to apply a high signal to one input of AND gate 21134. This high signal in combination with the enabled lead BYTE5, via OR gate 21133, clocks logic circuit 21137 to prepare high byte match circuit 21132 to receive next incoming data byte 6. In addition, logic circuit 21137 removes a low preset signal from logic circuit 21139. At time T3, FIFO load and data taken pulse generator apparatus 2110, FIG. 5, returns a data taken signal on lead DTOR1, loads byte 5 into FIFO store 2100 and clocks logic circuit 21144, FIG. 9. Since the output of NOR gate 21143 is high, logic circuit 21144 does not change state and maintains the low signal appearing on disposition available lead DSA. Since only a part of the node address has been received and matched no disposition is available at this time.

The low signal appearing on lead LDCK, FIG. 7, enables header byte counter 21120 to transfer the high signal output from lead BYTE5 to lead BYTE6. Since it is assumed that the incoming data, FIG. 8, is to be read by node 2 the node address registered in byte 6 next appearing on incoming ring transmission path 1 matches the node identification address recorded in high byte match circuit 21132. The resulting low signal output is applied to inputs of logic circuits 21138 and 21139.

The data available signal, FIG. 5, appearing on lead DAIR1 notifies FIFO load and data taken pulse generator apparatus 2110 that byte 6 is available on incoming ring transmission path 1. The enabling of strobe lead T2 in response thereto, FIG. 8, clocks logic circuit 21139 via AND gate 21130 and NAND gate 21136. Since a low signal appears on the output of high byte match circuit 21132, logic circuit 21139 changes state to apply a low signal on lead DMTCH to message disposition apparatus, FIG. 10. In the normal address matching mode a logical 1, or high signal, appears on leads BIT5,6. With a high signal on lead SMTCH1 and a low signal on lead DMTCH1, decoder 21150 places a low signal on read message lead READMSG via AND gate 21152 and inverter gate 21155.

At time T3, delay line 21105, FIG. 5, enables lead T3 to load byte 6, via lead LDCK, into FIFO store 2100 and return a data taken signal on lead DTOR1. With the low signal output of NOR gate 21143, FIG. 9, applied to the input of logic circuit 21144, the clock signal appearing on strobe lead T3 changes the state of logic circuit 21144 to enable disposition available lead DSA. The low signal concurrently appearing on lead DISPAV with the enabling of lead DSA presets logic circuit 21140 and initializes header byte counter 21120, FIG. 7.

When byte 1 reaches the output of FIFO store 2100, lead OR1, FIG. 14, enables delay line 21200 which in the aforementioned manner applies a high signal to the input of delay line 21202. At time T03 delay line 21202 enables disposition taken lead DISPT to reset the circuitry of disposition available apparatus 2114. Since a low signal appears on read message lead READMSG the delayed enabling of the T04 output of delay line 21202 clocks logic circuits 21208 and 21206 to place high signal on read lead RLX and on one input of NAND gate 21209.

The high signal appearing on an input of NAND gate 21209 in combination with a high signal input from ring access control 20 on lead RAC02 enables NAND gate 21209 to place a high signal on lead DREQ. Enabling lead DREQ notifies node processor 3, via control status signals apparatus 232 and data bus 23, that node 2 has data to be read from incoming ring transmission path 1 onto bi-directional data bus 23. Control status signals apparatus 232 acknowledges receipt of the request to read by placing a high signal on lead DAK. The enabling of lead DAK inhibits NAND gate 21201 and places a high signal on one input of NAND gate 21205.

Figure 11:
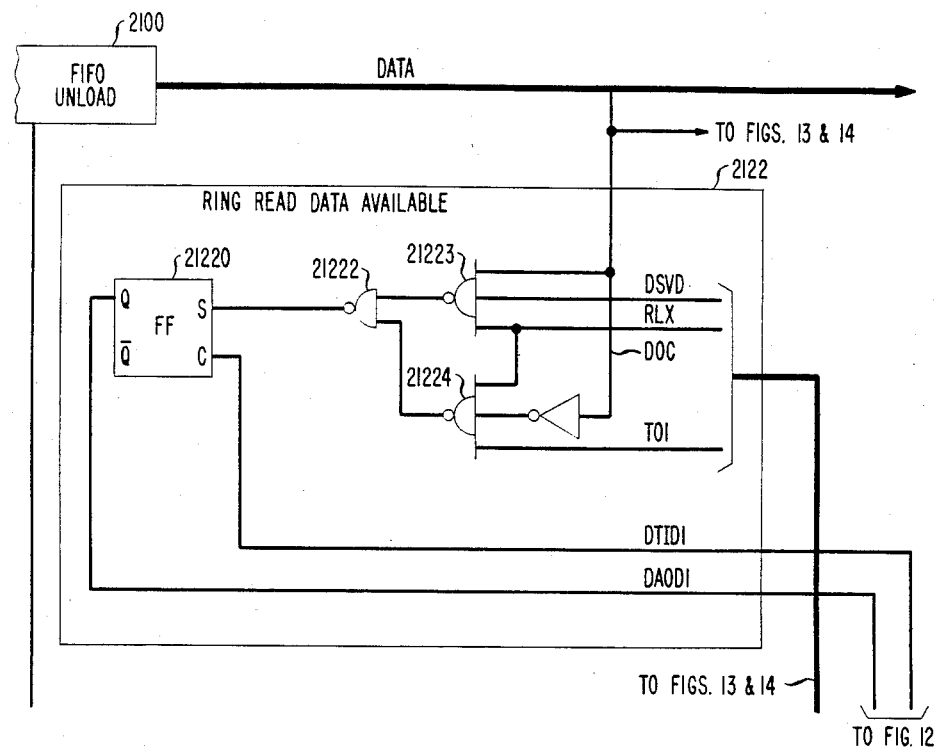
FIG. 11 shows logic circuitry of ring read data available apparatus for indicating data is available for propagation on an outgoing ring transmission path.

The high signal appearing on lead RLX, FIG. 11, along with high signals on leads DOC and DSVD enable NAND gate 21222 via NAND gate 21223 to set logic circuit 21220 and apply a data available signal to lead DAOD1. In addition to notifying control status signals 232 that a data byte is available, lead DAOD1 enables one input of AND gate 21210, FIG. 12.

When data byte 1 is taken, control status signal apparatus 232 returns a high signal on data taken in lead DT1D1. Lead DT1D1, FIG. 11, resets logic circuit 21220 of ring read data available apparatus 2122 to remove the high signal on lead DAOD1 and inhibits the other input of NAND gate 21210, FIG. 12. Inhibited NAND gate 21210 places a low signal on an input of NOR gate 21213 which in turn enables lead UNCK to unload data byte 1 from FIFO store 2100.

Byte 1 of the incoming data is thus read from incoming ring transmission path 1, FIG. 3, via data selector 12, data latch 2101, FIFO store 2100 and ring read apparatus 230 to data bus 23. Byte 2 of the incoming data appearing at the output of FIFO store 2100, FIG. 14, causes lead OR1, via delay line 21200, to enable lead T01. Since the C control bit of byte 2 is zero, lead T01, FIG. 11, in combination with lead RLX and the inverted lead DOC, enable logic circuit 21220 via NAND gates 21224 and 21222 to place a data available signal on lead DA0D1.

The data available and data taken sequence, FIG. 2, are independently continued by receive logic 211 and transmit logic 212 until the incoming data has been read onto data bus 23. Upon detecting an end of message indication, control status signals apparatus 232, FIG. 14, places a high signal on lead RDTC to enable NAND gate 21205 to preset logic circuit 21206 to remove the high signal from lead DREQ. Control status signals apparatus 232 responds by returning lead DAK to the inactive state.

Data Write

Node processor 3, FIG. 2, desiring to write onto ring transmission path 1 enables control status signals apparatus 232, FIG. 5, to place a high signal on request to write lead DREQWR. The high signal appearing on lead DREWQR enables NAND gate 21103. When byte 1 of the data header is available, control status signals apparatus 232 enables NAND gate 21103 via the data available in lead DAID1. The resulting low output of NAND gate 21103 enables delay line 21105 to place delayed signals on strobe lines T1, T2, T3, and T4.

Byte 1 appearing on data bus 23, FIG. 3, through ring write apparatus 231 and data selector 12 is loaded into data latch 2101 at time T2. Strobe lead T3, FIG. 5, in combination with the high signal appearing on lead DREQWR, enables NAND gate 21108 to place a low signal on the input of NAND gate 21107 and an inverted high signal on the data taken lead DTOD1. The high signal appearing at the output of NAND gate 21107 enables FIFO store, 2100 to receive byte 1 and header byte counter 2112 FIG. 7, to place a high signal on lead BYTE2. Lead BYTE2, FIG. 9, clocks logic circuit 21140 to partially enable AND gate 21141.

Figure 10:
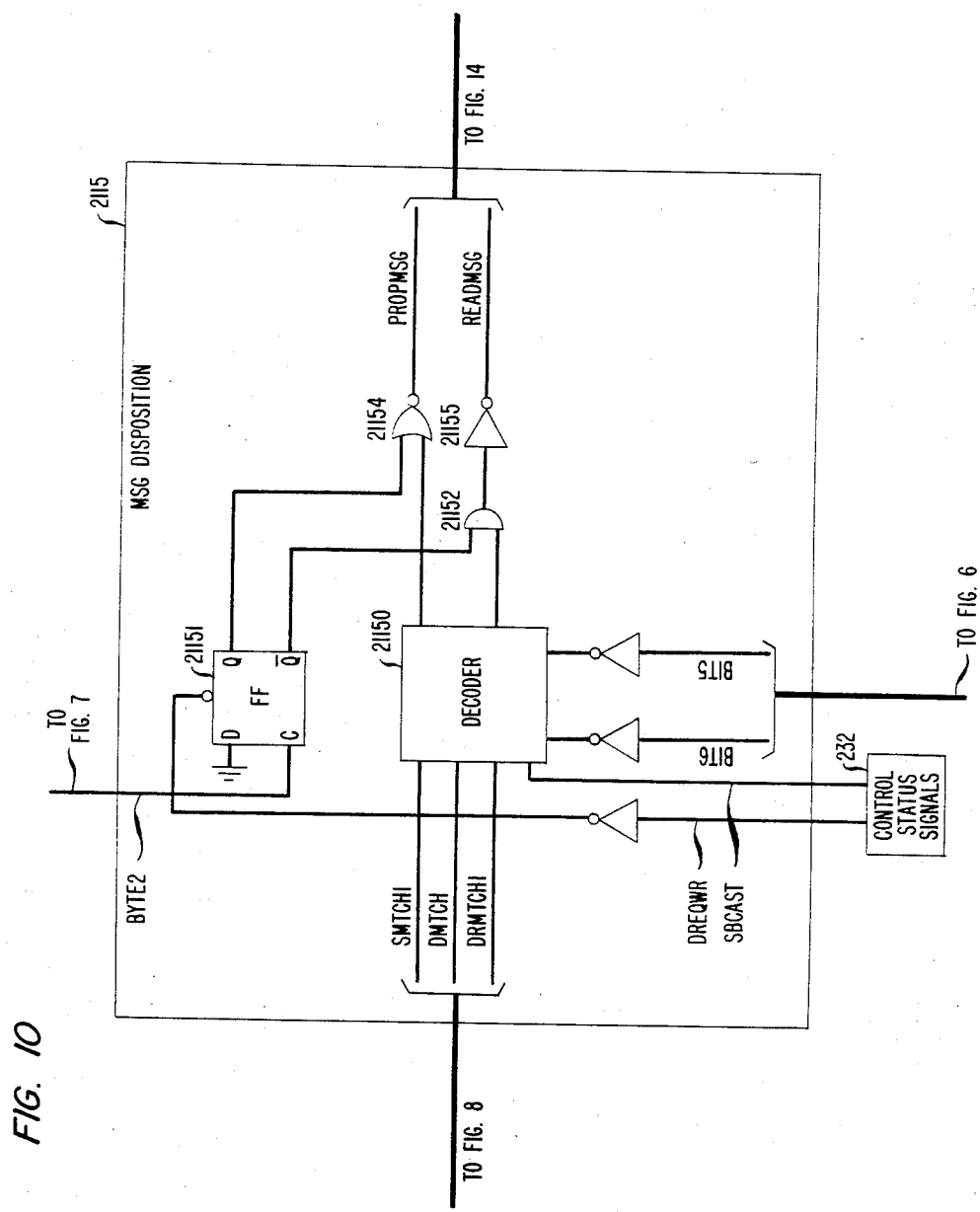
FIG. 10 shows message disposition apparatus for deriving information defining node disposition of data.

The presence of the inverted low signal appearing on write request lead DREQWR, FIG. 10, also presets logic circuit 21151 to place a high signal on an input of NOR gate 21154. NOR gate 21154 then places a low signal on the propagate message lead PROPMSG. Message disposition apparatus 2115 has thus derived information defining how node 2 is to dispose of the incoming data by propagating the data onto outgoing ring transmission path 1.

When FIFO store 2100 is ready to receive byte 6 shift register apparatus 2112 enables lead BYTE6, FIG. 9, via AND gate 21141 and NOR gate 21143 to place a low signal on the input of logic circuit 21144. Loading byte 6 into FIFO store 2100 at time T3 results in the clocking of logic circuit 21144 to generate a disposition available signal on lead DSA thereby indicating that information has been derived for defining node disposition of the incoming data.

Data byte 1, FIG. 14, appearing at the output of FIFO store 2100 enables disposition logic apparatus 2120 to reset the disposition available apparatus 2114, via lead DISPT, and controls the ring data available apparatus 2122, FIG. 3, and FIFO unload apparatus 2121 to write the received data onto outgoing ring transmission path 1. Receive logic 211, FIG. 2, as before, controls the receiving and storing of data bytes appearing on data bus 23 at a rate independent of the rate at which transmit logic 212 propagates the stored data bytes from buffer store 210 on outgoing ring transmission path 1.

Broadcast Data

Broadcast data, FIG. 4, identified by a logical zero appearing in destination control bits 5 and 6 of header byte 1 indicates that the incoming data is to be both read onto data bus 23 to node processor 3 and propagated out on a ring transmission path 0,1 to the following node 2. When header byte 1 of broadcast data is available on incoming ring transmission path 1, FIFO load and data taken pulse generator apparatus 2110 causes strobe lead T1, FIG. 6, to register bits 5 and 6 in latch 21110 of control byte latch apparatus 2111. The resulting low signals appearing on leads BIT5 and BIT6 inhibit AND gate 21142, FIG. 9, of the disposition available apparatus 2114 and prepare decoder 21150, FIG. 10, of message disposition apparatus 2115 to receive information from source and destination match apparatus 2113, FIG. 8. When header byte 5 is loaded into FIFO store 2100 enabled lead LDCK causes shift register apparatus 2112 to place a high signal on lead BYTE6. Enabled lead BYTE6 partially enables NAND gate 21136 and in combination with logic circuit 21140, FIG. 9, enables NAND gate 21141 to place a low signal via NOR gate 21143 on the input of logic circuit 21144.

The appearance of header byte 6 which is assumed to have a logical one in bit 7 identifying incoming ring transmission path 1, FIG. 8, places a high signal on lead BIT7 to the input of logic circuit 211310. At time T2 the FIFO load and data taken pulse generator apparatus 2110 enables AND gate 21130 to clock logic circuit 211310 and place a low signal on lead DRMTCH1. Decoder 21150, FIG. 10, responds to the low signals appearing on leads DRMTCH1, BIT5 and BIT6 by enabling both outputs extending to NOR gate 21154 and AND gate 21152. NOR gate 21154 responds by placing a low signal on propagate message lead PROPMSG and AND gate 21152 enables NOR gate 21155 to place a low signal on read message lead READMSG. At time T3, FIG. 9, strobe lead T3 clocks logic device 21144 to place a high signal on lead DSA as the indication that a disposition for the incoming data is available.

As earlier set forth, the appearance of byte 1 of the broadcast data at the output of FIFO store 2100, FIG. 14, enables delay line 21202 to clock logic circuits 21206, 21207 and 21208. With low signals appearing on leads PROPMSG and READMSG, logic circuits 21206, 21207 and 21208 enable leads DREQ, PLX and RLX respectively. Lead PLX, FIG. 13, in combination with lead T01 and subsequently enabled lead DSVD, reset logic circuit 21233 via NAND gates 21231 and 21232 to enable data available lead DAOR1.

Similarly, NAND gate 21223, FIG. 11, of ring read data available apparatus 2122 is enabled to set logic circuit 21220 via NAND gate 21222 to enable data available out lead DAOD1. Thus, on receipt of incoming broadcast data, FIG. 2, ring access control 1 has enabled data available out leads DAOR1 and DAOD1 to notify both the following node 2 and node processor 3 that data will be concurrently propagated on outgoing ring transmission path 1 and read onto data bus 23 via ring read apparatus 230.

Figure 12:
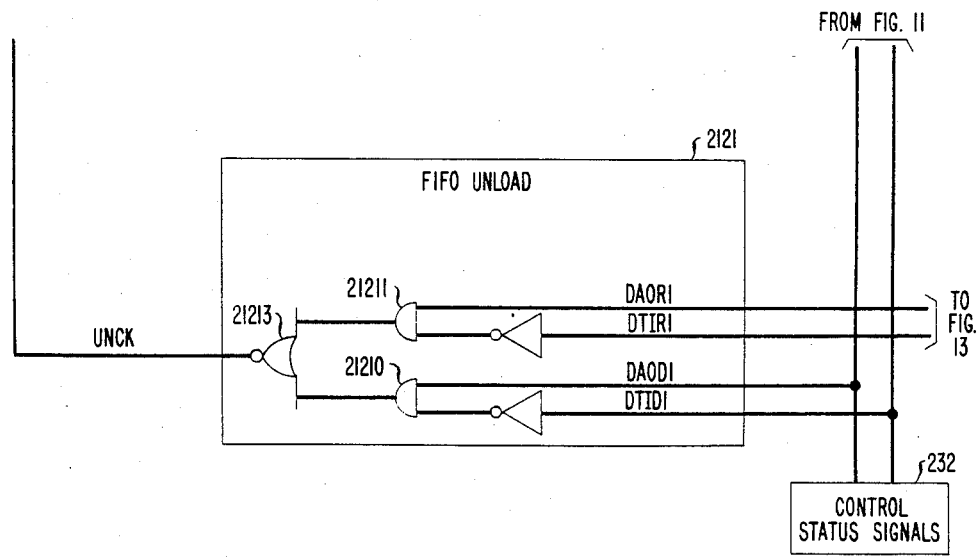
FIG. 12, sets forth logic circuitry of FIFO unload apparatus for unloading data from the buffer store.
Figure 13:
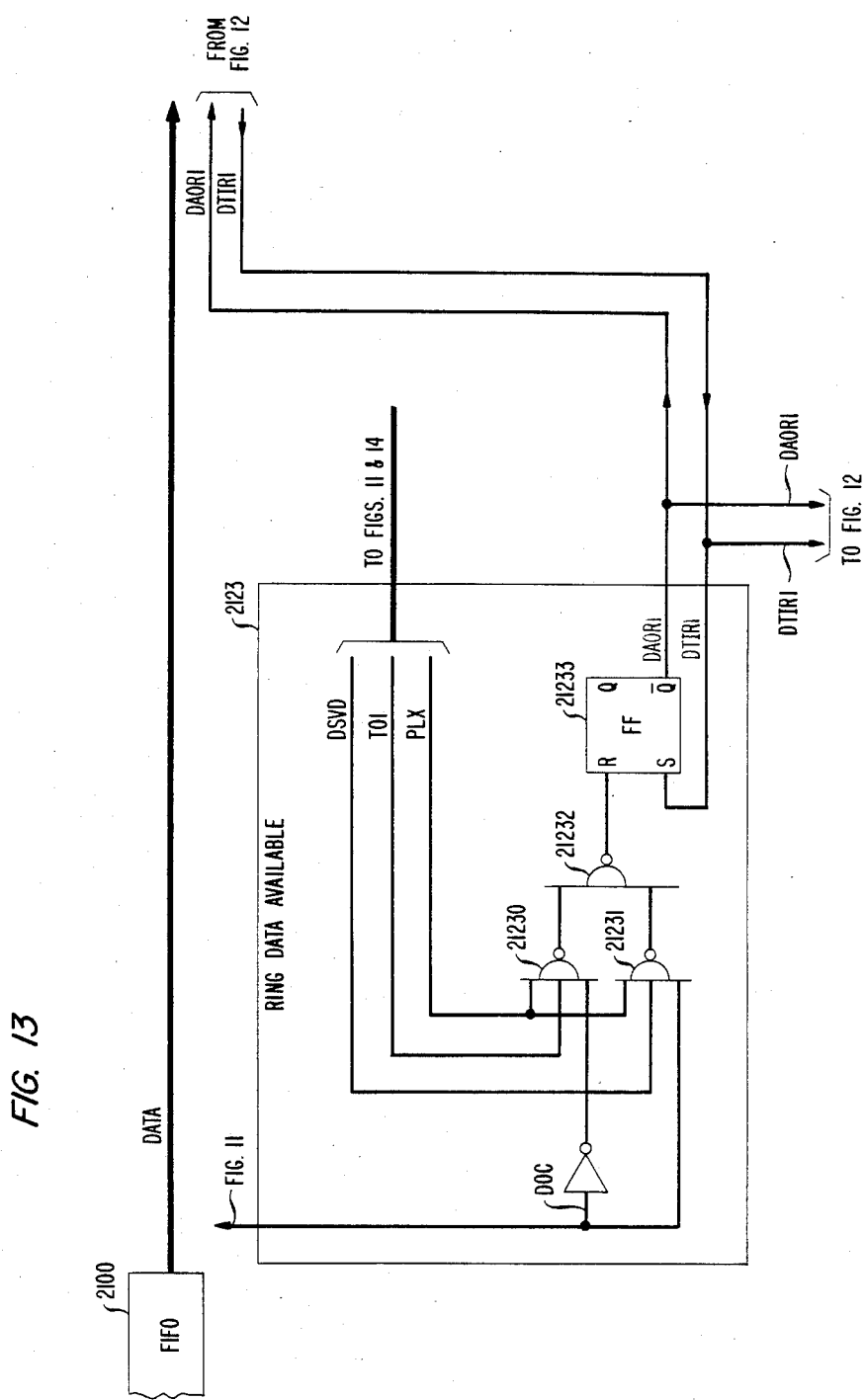
FIG. 13 shows logic circuitry of ring data available apparatus for indicating data is available for reading on a data bus to a data system.

Referring, to FIG. 12 of the drawing the enabled data available leads DAOR1 and DAOD1 in combination with inverted low signals appearing on data taken leads DTIR1 and DTID1 enable AND gates 21210 and 21211 to apply high output signals to NOR gate 21213 and thereby maintain a low signal on lead UNCK. Assuming that control status signals apparatus 232 returns the first data taken signal on lead DTID1, AND gate 21210 is inhibited to place a low signal on an input of NOR gate 21213.

Since AND gate 21211 is still enabled NOR gate 21213 maintains a low signal on lead UNCK. This condition will continue until such time that the following node 2 returns a data taken signal on lead DTIR1. Thus, with both data available leads DAOR1 and DAOD1 enabled, FIFO unload apparatus 2122 inhibits lead UNCK until data taken signals appear on both leads DTIR1 and DTID1. When the following node 2 on ring transmission path 1 enables lead DTIR1, AND gate 21211 is inhibited and in combination with inhibited AND gate 21210 inhibit NOR gate 21213 to place a high signal on lead UNCK to unload data byte 1 from FIFO store 2100. Byte 1 of the incoming broadcast data, FIG. 2, appearing at the output of buffer store 210 has been taken over outgoing ring transmission path 1 by the following node 2 and by node processor 3 over data bus 23 through ring read apparatus 230. Remaining bytes of the broadcast data are received at one rate over incoming ring transmission path 1 and are propagated at a rate independent of the received rate concurrently over outgoing ring transmission path 1 and through ring read apparatus 230.

On a selective broadcast message, data previously appearing on a ring transmission path 1 is read into node processor 3 notifying node processor 3 that this node 2 is one of several nodes selected to receive the next data message. Node processor 3 in response to this data, FIG. 10, enables selective broadcast lead SBCAST, via control status signals apparatus 232, coupled with decoder 21150. Byte 1 of the incoming selective broadcast data contains a logical zero in bit 5 and a logical one in bit 6 which are registered in control byte latch apparatus 2111 and appear as low and high signals on leads BIT5 and BIT6, respectively, which are coupled through inverters with decoder 21150. The destination ring identify, FIG. 4, assumed to be a logic one in bit 7 of byte 6, results in a high signal being applied over lead BIT7, FIG. 8, to logic circuit 211310. At time T2 following receipt of the data available signal for byte 6, logic circuit 211310 is clocked to place a low signal on lead DRMTCH1. The low signal appearing on lead DRMTCH1, FIG. 10, in combination with the signals appearing on leads SBCAST, BIT5 and BIT6 direct decoder 21150 to enable both propagate message lead PROPMSG and read message lead READMSG. Thus, when the disposition available lead DSA is subsequently enabled and the disposition has been taken, the incoming selective broadcast data will, in the aforementioned manner described for broadcast data, be concurrently propagated over outgoing ring transmission path 1, FIG. 2, to the following node 2 and transmitted through ring read apparatus 230 over data bus 23 to node processor 3.

SUMMARY

It is obvious from the foregoing that the facility, economy and efficiency of data system communication may be substantially enhanced by a data communication network arranged to propagate data at varying rates on ring transmission paths interconnecting nodes of the network. It is further obvious from the foregoing that a data communication network ring interface node arranged to receive data from ring transmission paths and data systems by deriving information defining node disposition of the data and generating a disposition signal enabling the ring interface node to propagate the incoming data in accordance with the derived disposition information at a transmitting rate independent of the received rate improves the data handling capabilities of data communication networks.

What is claimed is:

1. A node (2) for coupling a data bus (23) with ring transmission paths (0,1) to form a network enabling communication between data systems (6) coupled with the data bus
characterized in that
said node comprises
means (211) enabled by predefined data appearing at first data rates on the data bus and incoming ones of the ring transmission paths for defining node disposition of data as it appears on the data bus and incoming ring transmission paths and generating a disposition available signal,
means (210) coupled with the ring transmission paths and data bus for receiving and temporarily storing data, and one of said
means (212) responsive to a first predefined data appearing at an output of said receiving and temporarily storing means and enabled by said generated disposition available signal for controlling the node to receive the data and propagate the received data on the data bus and outgoing ones of the ring transmission paths at second data rates independent of said first data rates in accordance with said defined node disposition.

2. The node set forth in claim 1
characterized in that
said defining and generating means comprises
means (2110) coupled with incoming data available and data taken leads associated with the data bus and said incoming ring transmission paths and enabled by said incoming data available leads for taking a byte of data appearing on the data bus and said incoming ring transmission paths and loading said data taken byte in said receiving and temporarily storing means and returning a data taken signal on said data taken leads,
means (2111, 2112, 2113, 2115) enabled by predefined ones of said received data bytes for deriving information defining said node disposition of said incoming data, said
mean (2214) enabled by said data taking and loading means and by said information deriving means for generating said disposition available signal.

3. The node set forth in claim 2
characterized in that
said receiving and temporarily storing means comprises
means (210) for receiving said data bytes taken at said first data rates and temporarily storing said received data bytes for subsequent propagation at said second data rates independent of said first data rates.

4. The node set forth in claim 3
CHARACTERIZED IN THAT
said controlling means comprises
means (2122, 2123) for generating data available signals on outgoing data available leads associated with the data bus and said outgoing ring transmission paths,
means (2120) responsive to a first one of said predefined received data bytes appearing at an output of said receiving and temporarily storing means and enabled by said generated disposition available signal for selectively enabling said data available signal generating means in accordance with said derived node disposition information, and
means (2121) for unloading said received data bytes from said receiving and temporarily storing means and propagating said data bytes on the data bus and said outgoing ring transmission paths in accordance with data taken signals returned on incoming data taken leads associated with the data bus and said outgoing ring transmission paths.

5. The node set forth in claim 4 CHARACTERIZED IN THAT
said selectively controlling enabling means comprises
means (21207, 21208) enabled by said derived node disposition information for selectively enabling said data available signal generating means to place a data available signal on an outgoing data available lead associated with the data bus and on an outgoing data available lead associated with the ring transmission paths and the combination thereof.

6. The node set forth in claim 5 CHARACTERIZED IN THAT
said selectively enabling means comprises
means (21201, 21202) for generating a disposition taken signal to reset said disposition available signal generating means upon receipt of said generated node disposition available signal.

7. A node (2) for coupling a data bus (23) with ring transmission paths (0.1) to form a network enabling communication between data systems (6) coupled with the data bus
CHARACTERIZED IN THAT
said node comprises
means (210) coupled with the ring transmission paths and data bus for receiving and temporarily storing bytes of data,
means (211) enabled by predefined ones of said data bytes appearing at an input of said receiving and temporarily storing means at first data rates for deriving information defining a node disposition of the data and generating a disposition available signal, and
means (212) responsive to a first one of said predefined data bytes appearing at an output of said receiving and temporarily storing means and enabled by said generated disposition available signal for generating a disposition taken signal to reset said disposition available signal generating means and controlling the node to receive remaining data bytes and propagate the data bytes on said coupled ring transmission paths and data bus at second data rates independent of said first data rates in accordance with said derived disposition information.

8. The node set forth in claim 7 CHARACTERIZED IN THAT
said node receiving and temporarily storing means comprises
means (2100, 2101) for receiving said data bytes at said first data rates and temporarily storing said received data bytes for subsequent propagation at said second data rates independent of said first data rates.

9. The node set forth in claim 8 CHARACTERIZED IN THAT
said node deriving and generating means comprises
means (2210) coupled with incoming data available and data taken leads associated with the data bus and incoming ones of the ring transmission paths and enabled by a data available signal appearing on said incoming data available leads for loading a data byte in said receiving and temporarily storing means and returning a data taken signal on said data taken leads associated with said incoming data available leads when each data byte has been received and stored.

10. The node set forth in claim 9 CHARACTERIZED IN THAT
said node deriving and generating means comprises
means (2111) enabled by said loading means for registering predetermined bits of a first data byte appearing on said incoming ring transmission paths.

11. The node set forth in claim 10 CHARACTERIZED IN THAT
said node deriving and generating means comprises
means (2112) enabled by said loading means for counting said predefined data bytes.

12. The node set forth in claim 11 CHARACTERIZED IN THAT
said node deriving and generating means comprises
means (2113) enabled by said loading means and said counting means for matching ones of said predefined data bytes with an address of the node to identify data originated by and destined for the node.

13. The node set forth in claim 12 CHARACTERIZED IN THAT
said node deriving and generating means comprises
means (2115) enabled by said bit registering means and matching means upon a match of ones of said predefined data bytes with the node address for defining node disposition of the data.

14. The node set forth in claim 13 CHARACTERIZED IN THAT
said node deriving and generating means comprises
means (2114) responsive to receipt of said predefined data bytes and said matching means for generating said disposition available signal.

15. The node set forth in claim 14 CHARACTERIZED IN THAT
said node generating and controlling means comprises
means (2123) coupled with outgoing data available leads associated with outgoing ones of the ring transmission paths for generating a first data available out signal on said outgoing data available leads.

16. The node set forth in claim 15 CHARACTERIZED IN THAT
said node generating and controlling means comprises
means (2122) coupled with another outgoing data available lead associated with the data bus for generating a second data available out signal on said other outgoing data available lead.

17. The node set forth in claim 16 CHARACTERIZED IN THAT
said node generating and controlling means comprises
means (2120) responsive to said first data byte appearing at an output of said receiving and temporarily storing means for selectively enabling said first and second data available out signal generating means in accordance with the node disposition derived by said node disposition defining means.

18. The node set forth in claim 17 CHARACTERIZED IN THAT
said node generating and controlling means comprises
means (2121) responsive to the selectively enablement of said first and second data available out signal generating means for unloading said data bytes from said receiving and temporarily storing means and propagating said data bytes on said outgoing ring transmission lines and said data bus in accordance with data taken signals returned on incoming data taken leads associated with said data bus and outgoing ring transmission paths.

19. A node (2) for coupling a data bus (23) with ring transmission paths (0,1) coupled to other nodes to form a network enabling communication between data systems coupled with node data buses
CHARACTERIZED IN THAT said node comprises means (2100,2101) coupled with the ring transmission paths and data bus for receiving and temporarily storing bytes of data, means (2110) for loading successive bytes of said data appearing at first data rates on the data bus and incoming ones of the ring transmission paths in said receiving and temporarily storing means, means (2111) enabled by said loading means for registering predetermined bits of a first one of said data bytes, means (2112) enabled by said loading means for counting a predetermined number of said data bytes, means (2113) enabled by said loading means and said counting means for matching ones of said predefined data bytes with an address of the node to identify data originated by and destined for the node, means (2115) enabled by said bit registering means and said matching means upon a match of ones of said predefined data bytes with the node address for defining node disposition of the data, means (2114) responsible to receipt of said predefined data bytes and enabled by said matching means for generating a disposition available signal, means (2123) for generating a first data available out signal on outgoing data availability leads associated with outgoing ones of the ring transmission paths, means (2122) for generating a second available out signal on an outgoing data available lead associated with the data bus, means (2120) responsive to said first data byte appearing at an output of said receiving and temporarily storing means and enabled by said generated disposition available signal for selectively enabling said first and second data available out signal generating means in accordance with the disposition derived by said node disposition defining means, and means (2121) responsive to the selective enablement of said first and second data available out signal generating means for unloading said stored data bytes from said receiving and temporarily storing means and propagating said data bytes on said outgoing ring transmission paths and data bus at second data rates independent of said first data rates.

20. A node (2) for coupling a data bus (23) with ring transmission paths (0,1) coupled to other nodes to form a network enabling communication between data systems (6) coupled with node data buses
CHARACTERIZED IN THAT
said node comprises means (211) enabled by predefined broadcast data appearing on incoming ones of the ring transmission paths for deriving information defining node disposition of the broadcast data and generating a disposition available signal, means (2120) coupled with the ring transmission paths and data bus for receiving and temporarily storing said broadcast data, and means (212) responsive to a first one of said broadcast data appearing at an output of said receiving and temporarily storing means and enabled by said generated disposition available signal for controlling the node to receive said broadcast data and propagate said received broadcast data concurrently onto the data bus and outgoing ones of the ring transmission paths in accordance with said derived node disposition information.

21. A data communication network comprising a node (2) interconnecting ring transmission paths (0,1) with a data bus (23) to enable network communication with data systems (6) coupled with the data bus
CHARACTERIZED IN THAT
said node comprises means (210) coupled with the ring transmission paths and data bus for receiving and temporarily storing data, means (2110) for taking successive bytes of data appearing on the data bus and incoming ones of said ring transmission paths and loading said taken data bytes at a first data rate in said receiving and temporarily storing means, means (2120, 2121, 2122, 2123) for propagating successive ones of said temporarily stored data bytes on the data bus and outgoing ones of the ring transmission paths at a second data rate independent of said first data rate, and means (2111, 2112, 2114, 2115) enabled by predefined ones of said taken data bytes for defining node disposition of the data and for generating a disposition available signal for controlling said propagating means to propagate said temporarily stored data bytes on the data bus and outgoing ring transmission paths in accordance with said defined node disposition.

22. The data communication network node set forth in claim 20
CHARACTERIZED IN THAT
said receiving and temporarily storing means comprises a first in first out buffer (2100) store for receiving successive ones of said data bytes at an input thereof and propagating said received data bytes through said buffer store to an output thereof at a third data rate independent of said first and second data rates.

23. A data communication network comprising a node interconnecting transmission paths to form a network enabling communication with data systems coupled with ones of the transmission paths, said node comprising means coupled with the transmission paths for receiving and temporarily storing bytes of data, means for taking first ones of data bytes appearing on incoming ones of the transmission paths and sequentially loading said taken data bytes at first data rates in said receiving and temporarily storing means, means enabled by predefined ones of said taken first data bytes for defining node disposition of the data and for generating a disposition available signal, and means responsive to a first one of predefined data bytes appearing at an output of said receiving and temporarily storing means and enabled by said generated disposition available signal for controlling the node to sequentially receive remaining ones of said data bytes at said first data rates and propagate said received data bytes at second data rates independent of said first data rates on outgoing ones of the transmission paths in accordance with said defined node disposition.

24. A method for enabling data communication through a node coupling a data bus with ring transmission paths to form a network interconnecting data systems coupled with the data bus comprising the steps of defining a node disposition of incoming data from predefined ones of incoming parallel bit data bytes appearing on multiple leads of the data bus and incoming ones of the ring transmission paths at first data rates, receiving and temporarily storing said incoming data bytes, generating a disposition available signal, and controlling the node in response to a first stored ones of said predefined data bytes and said generated disposition available signal to receive subsequent bytes of said incoming data and propagate said incoming data bytes at second data rates independent of said first data rates on multiple leads of the data bus and outgoing ones of the ring transmission paths in accordance with said defined node disposition.

* * * * *